July 6, 1965
R. L. HERRING
3,193,673
ILLUMINATED VEHICLE COMPARTMENT WITH
CLOSURE OPERATED LIGHT SWITCH
Filed Nov. 19, 1962
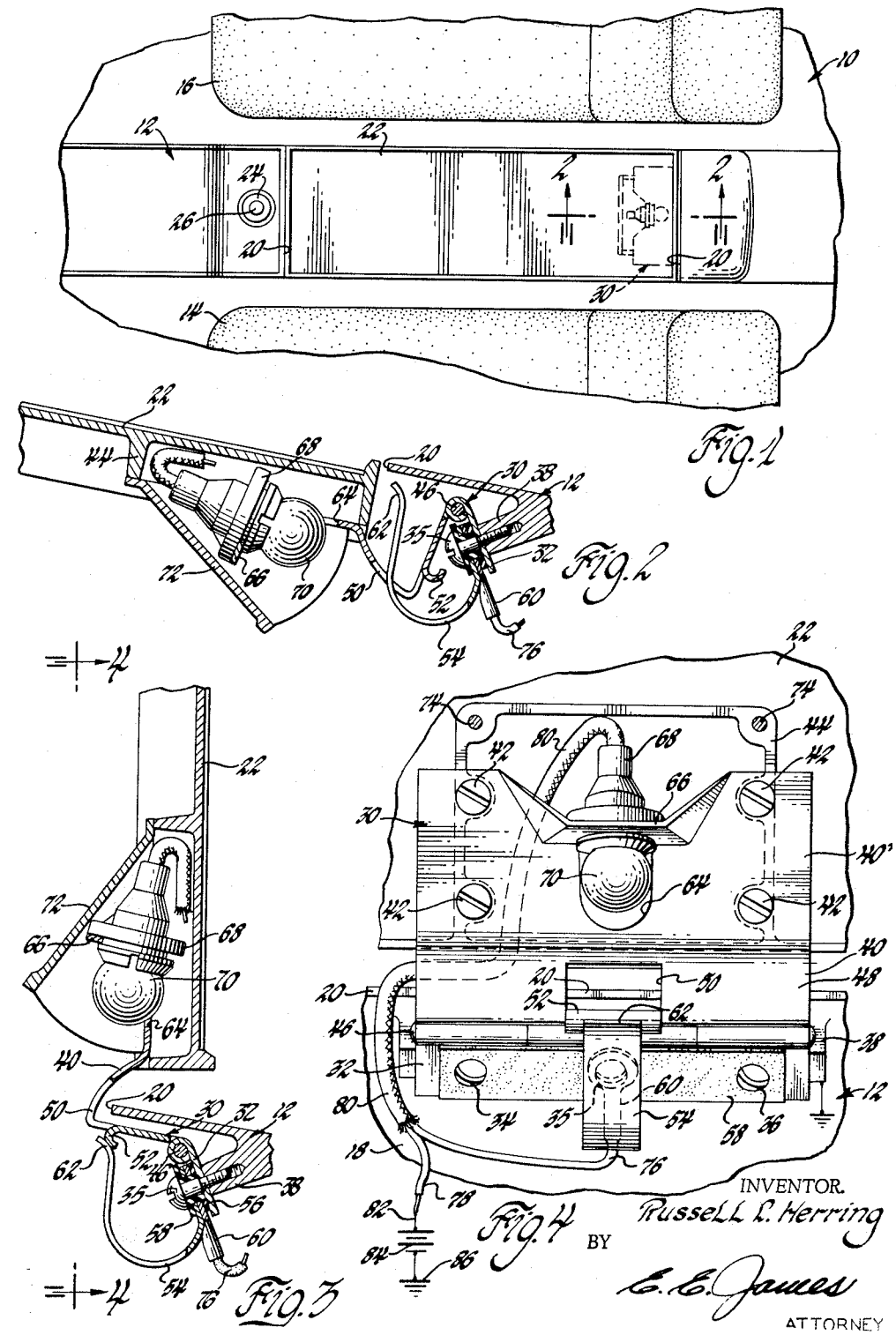
INVENTOR.
Russell L. Herring
BY
E. E. James
ATTORNEY

United States Patent Office 3,193,673
Patented July 6, 1965

3,193,673
ILLUMINATED VEHICLE COMPARTMENT WITH CLOSURE OPERATED LIGHT SWITCH
Russell L. Herring, Grosse Pointe Woods, Mich., assignor to General Motors Corporation, Detroit, Mich., a corporation of Delaware
Filed Nov. 19, 1962, Ser. No. 238,379
5 Claims. (Cl. 240—7.1)

This invention relates to a combined hinge switch and hold-open device adapted to hinge the closure lid of a storage console for an automotive vehicle or the like and to energize an interior courtesy light as the closure lid is moved between an intermediate opened position and a hold-open maintained fully opened position.

The invention particularly contemplates a device of the type indicated which is of relatively simple inexpensive design capable of being easily assembled and accessible for in-service switch inspection and adjustment.

The several contemplated objectives of the invention are accomplished in a preferred illustrative embodiment, hereinafter described with reference to the accompanying drawing, wherein the console member is electrically grounded to the vehicle body. A first hinge member is secured to the console member within its storage compartment adjacent one side of its access opening and electrically grounded therethrough. A second hinge member is secured adjacent one end to the closure member and is electrically and pivotally connected at its opposite end to the grounded first hinge member for swinging movement of the closure lid member between a console closing position and a hold-open maintained fully opened position. An intermediate gooseneck portion of the second hinge member has an opening therethrough defining a rolled switch contact lip adjacent its pivoted end. This lip is slidably and electrically engageable with an electrical switch contact and hold-open leaf spring as the closure lid is moved between an intermediate opened position and a fully opened position wherein the contact lip contacts a detent defining free end of the hold-open spring. The opposite end of the hold-open spring is secured to and electrically insulated from the console and first hinge members. Grounding contact between the hold-open leaf spring and the contact lip of the second hinge member as the closure lid is moved to an opened position completes an electrical circuit through a courtesy light carried by the lid secured end of the second hinge member and thus illuminates the interior of the console compartment.

The foregoing and other objects, advantages and features of the invention will be apparent from the following description of the preferred illustrative embodiment having reference to the accompanying drawing, in which:

FIGURE 1 is a fragmentary top elevational view of a portion of the passenger compartment interior of a sports type automotive vehicle and shows a storage console illustrative of the intended environment of the invention;

FIGURE 2 is a fragmentary sectional view taken substantially in the direction of the arrows and in the plane of the line indicated at 2—2 of FIGURE 1 and shows the console, the console lid and the several elements of the combined hinge switch and hold-open device of the invention in their respective lid closure positions;

FIGURE 3 is a fragmentary sectional view similar to FIGURE 2 showing the several elements in their hold-open maintained, fully opened switch engaged positions; and FIGURE 4 is a fragmentary elevational and somewhat diagrammatic view taken substantially in the direction of the arrows indicated at 4—4 of FIGURE 3 with a lid mounted light shielding plate removed and shows the electrical console lighting circuit provided by the several elements of the combined hinge and switch hold-open device of the invention in their maintained, fully opened positions.

Referring more particularly to FIGURE 1, a forward portion of the passenger compartment interior of a sports type automotive vehicle is indicated generally by the reference numeral 10. A storage console 12 is mounted on the floor of the vehicle body between two spaced bucket type seats 14 and 16. This console defines a storage compartment 18 having an access opening indicated at 20 in the several figures of the drawing. A closure lid 22 is hinged at the rear of the box for swinging movement between its closed position partially shown in FIGURE 2 and its fully opened, hold-open maintained position partially shown in FIGURES 3 and 4. When actuated to its closed position, the forward end of the closure member 22 is engaged by a suitable latch mechanism. Such a latch mechanism is partially shown at 24 and include a push button release actuator 26 mounted on the top of the console box forwardly of the access opening.

As indicated above, the closure lid 22 is hinged to the rear of the console box by a combined hinge switch and door hold-open assembly incorporating the instant invention. This combined hinge device is indicated generally by the reference numeral 30 and includes a stationary hinge member 32 secured at 34, 35 and 36 to a mounting flange 38 extending laterally of the console box within the storage compartment 18. A second hinge member 40 has an end portion 40' secured at 42 to a mounting boss 44 formed on the underside of the closure lid 22. The opposite end of the hinge member 40 is pivotally connected at 46 to the console mounted hinge member 32. The console box is electrically grounded to the vehicle body and chassis through its mounting on the body floor pan and thus serves as a grounding connection for the hinge members 32 and 40. An intermediate gooseneck portion 48 of the hinge member 40 permits the concealed mounting of the hinge members and provides desired upward swinging opening movement of the closure member. In the illustrative embodiment, this intermediate gooseneck portion is centrally perforated at 50 and rolled along its edge adjacent the pivot 46 to form a grounding contact bead or lip 52.

A C-shaped spring 54 is secured to the inner console box flange 38 by the central hinge mounting screw 35. The spring 54 serves both as a switch contact arm and as a hinge detenting hold-open member. Two perforated insulating strips 56 and 58 insulate the spring from the hinge member 32, the console box and its mounting screw. These insulating strips cooperate to mount the adjacent end of the spring 54 in electrical contact with a connector 60. As shown in FIGURE 2, the opposite free end of the spring 54 projects upwardly through the opening 50 of the intermediate gooseneck portion of the second hinge member in spaced relation thereto when the lid member is in its console closing position. As the lid member is swung upwardly in an opening direction, the contact lip 52 of the hinge member 40 engages the upwardly extending portion of the spring thereby effecting a grounding connection therebetween. Such grounding connection is maintained by resilient deflection of the spring as the lid member is opened beyond this initial contact effecting, intermediate opened position. The upper free end of the spring 54 is bent to provide a curved hold-open detenting end portion 62. As the console lid member 22 approaches its fully opened position shown in FIGURE 3, the spring 54 acts through the effected engagement between its curved end portion and the contact lip 52 of the hinge member 40 to resiliently maintain or hold the hinge member 40 and the console lid 22 substantially in their fully opened hold-open positions.

The lid secured end portion of the second hinge member has a central perforation indicated at 64 and is upset to define an angled flange 66 intersecting this perforation. A molded socket 68 of suitable resilient insulating material is suitably flanged and slidably mounted by the flange 66 within the intersected portion of the perforation 64. This socket mounts a console illuminating light bulb 70. The socket 68 and the light bulb 70 are partially enclosed by a shield or shade member 72 secured at 74 to the hinge mounting boss 44 of the closure lid. The light shading shield directs the light emanating from the bulb 70 downwardly into the interior of the console box. The light bulb engaging terminals of the socket 68 are connected to two wires 76 and 78 extending therefrom through a suitable insulating sheath 80. The distal end of the wire 76 is connected through the connector 60 to the spring 54. The corresponding end of the wire 78 is connected at 82 to a power terminal of the vehicle power supply including a battery 84 suitably grounded to the vehicle body as indicated at 86.

Opening movement of the console lid effects a grounding connection between the spring 54 and the contact lip 52 of the hinge member 40 and thus completes the electrical circuit energizing the bulb 70 to illuminate the interior of the console box. Closing movement of the lid carrying the contact lip 52 out of engagement with the spring 54 similarly opens the console lighting electrical circuit thus turning off the light.

From the foregoing description of an illustrative embodiment, it will be seen that the invention provides a combined hinge switch and hold-open device of relatively simple inexpensive design capable of providing the various contemplated objectives and advantages. It will be further apparent that various changes and modifications might be made in and from the disclosed construction without departing from the spirit and scope of the invention as defined in the following claims.

I claim:

1. In combination with a vehicle body member forming a compartment having an access opening closable by a lid member hinged for swing between closed and opened positions and having a courtesy light adapted to light the interior of the compartment, a combined hinge and switch assembly comprising a first hinge member secured to the body member at one side of the access opening, a second hinge member secured to the lid member and pivotally connected to the first hinge member, said hinge members being electrically grounded to the vehicle body and one of the hinge members forming a grounded switch contact edge parallel to and slightly spaced from the pivotal connection between the hinge members, a contact leaf spring member having one end mounted on and electrically insulated from the other of said hinge members, said leaf spring member having an unsupported end portion normally spaced from the ground switch contact when the lid member is in its closed position and being resiliently deflected and slidable on the grounded switch contact as the lid member is moved between intermediate and fully opened positions, and circuit means including a vehicle body grounded source of electrical potential connected in series through the courtesy light to the contact leaf spring whereby the leaf spring grounds the electrical circuit to energize the courtesy light as the lid member is moved between its intermediate and fully opened positions and opens the circuit therethrough to deenergize the light as the lid member is moved between its intermediate opened and closed positions.

2. A combined hinge and switch device adapted to hinge the closure lid of an automotive vehicle storage console or the like and to energize an interior courtesy light when the closure lid is actuated to an opened position, said hinge and switch device comprising a first hinge member mountable within the console member at one side of the access opening connectable to one terminal of an electric power source, a second hinge member having an end portion mountable on the closure lid and electrically and pivotally connected at its other end to the first hinge member for swinging movement of the closure lid between a console closing position and an opened position, said second hinge member having an intermediate goosenecked portion centrally pierced to form a contact receiving opening and a contact surface adjacent its pivoted end, a leaf spring contact member secured to and electrically insulated from the console and first hinge member, said leaf spring member having a depending portion projecting through the pierced opening in the second hinge member in spaced relation to said contact surface when the closure lid is in its console closing position and electrically and slidably engageable and resiliently deflected by the contact surface on the second hinge member as the closure lid is actuated between an intermediate opened position and its fully opened position, and circuit means including a courtesy light mounting socket carried by one of the hinged members and having a first lead connectable to a second terminal of the electrical power source and a second lead connected to the insulated leaf spring member whereby the depending portion of the leaf spring member acts as a switch arm engaging said surface and completing the electrical circuit to energize a socket mounted courtesy light as the closure lid is moved between its intermediate and fully opened positions and opens the electrical circuit therethrough as the closure member is moved between said intermediate opened position and its console closing positions.

3. A combined hinge switch and hold-open device adapted to hinge the closure lid of an automotive vehicle storage console or the like and to energize an interior courtesy light while maintaining the closure lid in an opened position, said device comprising a first hinge member mountable within the console member at one side of the access opening, a second hinge member having an end portion mountable on the closure lid and pivotally connected to the first hinge member for swinging movement between a console closing and opened position, said hinge members being electrically groundable to the vehicle body through the console member, one of said hinge members defining a contact lip spaced from the pivotal axis thereof, a leaf spring having one end secured to and electrically insulated from the other of the hinge members, said leaf spring having a depending end portion spaced from the contact lip of said one hinge member when the closure lid is in its console closing position and electrically and slidably engaged and resiliently deflected by said contact lip as the closure lid is actuated between an intermediate opened position and its fully opened position, and the depending free end of the leaf spring forming a detenting surface resiliently engageable with the contact lip of the one hinge member and cooperating therewith to detent and maintain the lid member in its fully opened position, and circuit means for connecting the power terminal of a grounded source of electrical potential through the console courtesy light to the secured insulated end of the leaf spring whereby the leaf spring acts as a grounding switch completing the electrical circuit to energize the courtesy light as the closure lid is moved between its intermediate and fully opened positions and opening the circuit therethrough as the closure member is moved between its intermediate opened and console closing positions.

4. A combined light mounting hinge switch and hold-open device adapted to hinge the closure lide of an automotive vehicle storage console or the like and to energize an interior courtesy light while maintaining the closure lid in an opened position, said combined device comprising
- a first hinge member mountable within the console member at one side of the access opening and electrically groundable therethrough,
- a second hinge member having an end portion mountable on the closure lid and pivotally connected at its other end to the first hinge member for swinging movement between a console closing position and an opened position,
- said second hinge member having an intermediate goosenecked portion having an opening defining a ground contact lip adjacent its pivoted end,
- a leaf spring secured to and electrically insulated from the first hinge member,
- said leaf spring having a depending portion projecting through the opening in the gooseneck portion of the second hinge member in spaced relation to the contact lip when the hinge members are in their console closing position and being electrically and slidably engageable and resiliently deflected by the contact lip of the second hinge member upon movement of the hinge members between an intermediate partially opened and their maintained fully opened position,
- the depending free end of said leaf spring being formed to define a detenting surface resiliently engageable with the contact lip to maintain the lid member in its fully opened position,
- the lid mountable end portion of said second hinge member having a perforation therethrough and being upset to define a flange intersecting the perforation therethrough,
- a light mounting socket slidably supported within the flange intersected perforation of the second hinge member and having a first lead electrically connectable to the power terminal of a grounded source of electrical potential and having a second lead connected electrically to the insulated leaf spring whereby the leaf spring acts as a grounding switch for completing the electrical circuit to energize the socket mounted courtesy light as the closure lid is moved between its intermediate and fully opened positions and opening the electrical circuit therethrough as the closure lid is moved between its intermediate opened and console closing positions.

5. A combined light mounting hinge, switch and hold-open device adapted to hinge a closure lid of an automotive vehicle storage console or the like and to energize an interior courtesy light while maintaining the closure lid in an opened position, said combined device comprising
- a first hinge member mountable on the console member at one side of the access opening and electrically groundable therethrough,
- a second hinge member having an end portion mountable on the closure lid and electrically and pivotally connected at its other end to the first hinge member for swinging movement between a console closing position and an opened position,
- the lid mountable end portion of said second hinge member defining a flange intersecting a perforation therethrough,
- a light mounting socket slidably supported within the flange intersected perforation of the second hinge member,
- hold-open means operable between said hinge members to maintain the closure lid in its opened position,
- and electrical circuit means connectable across a source of power and including said light mounting circuit and said hold-open means,
- and said hold-open means being operable to energize said circuit when said hinge members are in their maintained opened positions.

References Cited by the Examiner
UNITED STATES PATENTS

| 1,845,401 | 2/32 | Dietrich | 240—7.1 |
| 2,228,456 | 1/41 | Hobbs | 240—25 |
| 2,431,491 | 11/47 | Lee et al. | 240—6.45 |
| 2,736,005 | 2/56 | Craddock | 240—7.1 X |
| 2,891,140 | 6/59 | Huff | 240—7.1 |
| 2,976,398 | 3/61 | McKee et al. | 240—6.45 |

NORTON ANSHER, *Primary Examiner.*